Oct. 2, 1962 — O. D. JACOBSON ETAL — 3,056,868

SWITCHING DEVICE

Filed Aug. 3, 1959 — 2 Sheets-Sheet 1

INVENTORS O. D. JACOBSON
H. K. KRANTZ
BY
*[signature]*
ATTORNEY

Oct. 2, 1962                O. D. JACOBSON ETAL                3,056,868
                                SWITCHING DEVICE
Filed Aug. 3, 1959                                          2 Sheets-Sheet 2

INVENTORS  O. D. JACOBSON
           H. K. KRANTZ
BY
           *Tn Turner*
           ATTORNEY

United States Patent Office 3,056,868
Patented Oct. 2, 1962

3,056,868
SWITCHING DEVICE
Oscar D. Jacobson, Bronx, N.Y., and Hubert K. Krantz, Springfield, N.J., assignors to Bell Telephone Laboratories, Incorporated, New York, N.Y., a corporation of New York
Filed Aug. 3, 1959, Ser. No. 831,237
17 Claims. (Cl. 200—87)

This invention relates to electromagnetic switching devices and pertains particularly to those switching devices operable in response to the concurrent energization of two sources of magnetic energy.

In the electrical communications art, use is frequently made of devices which respond to the concurrence of two events, such as the operation of two relays or the energization of two coils, to complete one or more circuits in an electrical network. An example of such a device is to be found, for instance, in Patent 2,187,115 issued to W. B. Ellwood and W. H. T. Holden on January 16, 1940, wherein two groups of long coils are arranged to cross each other to form parallelepipedal apertures at each point where a coil of one group crosses a coil of the other group and a pair of electromagnetically responsive circuit closing contacts is placed in each aperture, the contacts in a particular aperture being operated to close a circuit connection when a corresponding coil of one group and a corresponding coil of the other group are energized. In addition to such coordinate devices, use is also made of more simple apparatus which corresponds essentially to a single aperture or modular component thereof; that is, apparatus which involves the use of only two coils, not necessarily parallelepipedal, and a single pair or set of pairs of contacts associated therewith. It is to the latter type of apparatus that the present disclosure is particularly directed, although it will be apparent that the features set forth will also find application in coordinate devices such as that shown in the Ellwood-Holden patent.

In devices of the aforementioned character, the electromagnetically responsive circuit closing contacts may advantageously be incorporated in the now well-known dry reed type of switch. Such a switch consists essentially of a pair of flexible magnetic reeds sealed into an envelope of vitreous material, the reeds being disposed within the envelope in spaced overlapping relationship to define a contact gap therebetween. The dry reed switch is extremely sensitive and fast operating.

Magnetically operable devices require a certain minimum magnetic flux to effect their operation. In devices responsive to the concurrent energization of two sources of magnetic flux, this minimum is usually through the additive flux contributions of both sources. Difficulty, in the form of false operation, may be encountered when only one of the sources is energized if due to a line transient or similar fortuitous event, that source is over-energized to the extent that the device operates under the influence of that source alone. This problem is especially likely to be encountered when dry reed switches are employed as contact units in such a device since, due to their high sensitivity, these switches are particularly susceptible of operation by even brief transients and other normally inconsequential energizing circuit irregularities.

The main object of the invention is to provide an improved device of the aforementioned character employing a dry reed switch which cannot be operated in response to the energization of only one source of magnetic energy.

The main feature whereby the foregoing object is attained is a switching device comprising a dry reed switch, two magnetic energy sources and a magnetic shunt element wherein the switch and the shunt element are disposed to define a flux divider network with respect to magnetic flux generated by the energy sources. When either one of the energy sources is active alone, the flux divider network will divert a sufficient proportion of the total flux generated by that source from the operating portion (contact gap) of the dry reed switch to render the switch incapable of operating.

The flux divider network according to the foregoing feature will divert magnetic flux from the contact gap of the dry reed switch according to the proportions prescribed by the reluctances constituting the network. It is conceivable, however, that if either of the energy sources were able to introduce an unlimited amount of magnetic flux into the divider network, no proportion less than all of that flux would have to be diverted from the contact gap of the switch in order to positively assure the non-operation of the switch when one source is energized alone. In addition, it is advantageous to be able to design the flux divider network to accommodate a known maximum flux load.

A particular object of the invention is to provide an improved device in accordance with the above main feature wherein the magnetic flux appearing in the contact gap of the dry reed switch due to the energization of one source alone is limited to a certain maximum amount.

The particular feature whereby the preceding object is attained is a switching device in accordance with the main feature wherein one energy source is associated with one reed of the dry reed switch and the other energy source is associated with the shunt element, the one reed and the shunt element being saturable by their respective energy sources to thus determine the maximum amount of magnetic flux which may appear in the contact gap of the switch due to the energization of either energy source alone.

Another particular object of the invention is to provide an improved device in accordance with the above main feature which has wide and well-defined operating characteristics. The feature whereby this object is attained is a device according to the main feature wherein one energy source is associated with one reed of the dry reed switch and the other energy source is associated with the shunt element, the one reed being saturable by a lower degree of energization of its corresponding energy source than is the shunt element.

Still another particular object of the invention is to provide an improved device in accordance with the foregoing main feature wherein the flux divider network is efficient and has wide tolerances.

The particular feature whereby the preceding object is attained is a switching device in accordance with the above main feature wherein the shunt element is so positioned with respect to the magnetic reeds of the dry reed switch as to take advantage of the flexibility of these reeds. The positioning contemplated is one wherein the reluctance between the shunt element and the one reed having an energy source associated therewith is less than the reluctance between the shunt element and the other reed. Such a device will react to the energization of only one source of magnetic energy by causing the switch contact gap reluctance to increase, thereby increasing the amount of magnetic flux needed to operate the switch.

Another particular object of the invention is to provide an improved device in accordance with the above main feature which is readily adjustable. This object is attained by a particular feature of the invention which consists in positioning the shunt element outside the envelope of the dry reed switch. Since the shunt element is thus not integrated into the unitary structure of the switch, its position may be varied to accommodate different types of reed switches, different operating conditions and varying requirements imposed upon the flux divider network.

Yet another particular object of the invention is to provide an improved device in accordance with the above main feature which is adapted to being held in its operated condition without the expenditure of electrical power. The corresponding feature of the invention is the provision of a permanent magnet element in the aforementioned improved device for continually maintaining a flow of magnetic flux in the flux divider network.

Another particular object of the invention is to provide an improved device in accordance with the foregoing feature in a practical and economical way. The particular feature whereby this object is reached is the use of readily available dry reed switches in connection with a simple, reliable structure outside the envelope of the switch. This structure employs electrically energizable coils as magnetic energy sources and these coils, together with the shunt and permanent magnet elements are readily obtainable and may be disposed outside of the switch envelope without requiring a special, complex and expensive design.

Another particular object of the invention is to provide an improved device in accordance with the above main feature which is efficient. This object is attained by a feature of the invention which consists in positioning a magnetic shield outside the envelope of the dry reed switch, the shield forming a portion of the flux divider network.

Still another particular object of the invention is to provide an improved device in accordance with the foregoing features and which is readily adaptable to multi-switch assembly and modular design techniques. This object is attained in accordance with the feature of the invention which consists in positioning the structure associated with the dry reed switch outside the envelope thereof. The structure configuration may then be adapted to cooperate with a plurality of switches and may be designed to produce a compact and efficient multi-contact switching device.

A specific object of the invention is to produce an improved device in accordance with all of the above-stated objects. A specific feature of the invention is, accordingly, an improved switching device comprising a dry reed switch having an envelope and two reeds sealed therein; a magnetic shunt element outside the envelope defining a magnetic flux divider network with the two reeds, wherein the reluctance between the shunt element and one reed is less than the reluctance between the shunt element and the other reed; one electrically energizable coil outside the switch envelope associated with the one reed, the one reed being saturable by flux produced by this one coil; another electrically energizable coil outside the switch envelope and associated with the shunt element, the shunt element being saturable by flux produced by this other coil; a permanent magnet element outside the switch envelope; and a magnetic shield also outside the switch envelope and forming a portion of the flux dividing network; the shunt and magnet elements, the shield and the two coils constituting a simple and reliable structure outside the dry reed switch envelope. The structure so constituted may be constructed to cooperate with a plurality of dry reed switches.

Another specific object of the invention is to produce an improved device according to the last-stated object and which has a plurality of contacts. The corresponding feature of the invention is an improved multicontact switching device comprising a plurality of dry reed switches coextensive with and parallel to each other, each switch having an envelope and corresponding select and hold reeds, said reeds being sealed into the envelope; a tubular magnetic shunt outside the envelopes defining a magnetic flux divider network with the plurality of reed pairs, wherein the reluctance between the tubular shunt and the hold reeds is less than the reluctance between the tubular shunt and the select reeds; one tubular, electrically energizable coil disposed about the envelopes and associated with the hold reeds, the hold reeds being saturable by flux produced by this one coil; another tubular, electrically energizable coil disposed about the tubular shunt, the shunt being saturable by flux produced by this other coil; a permanent magnet outside the envelopes; and a tubular magnetic shield disposed about the other coil and forming a portion of the flux dividing network; the magnet, shunt, shield and coils constituting a simple and reliable structure outside the plurality of dry reed switch envelopes.

These and other objects and features will appear from the following description:

The drawings consist of two sheets with eight figures, as follows.

Figure 1:
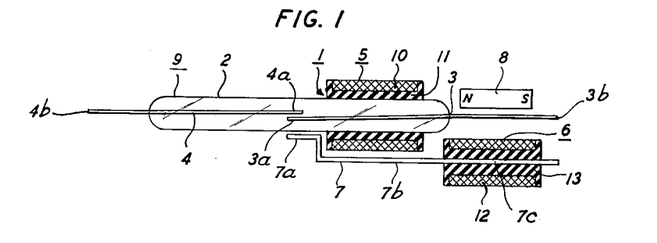
FIG. 1 is a view, partially in cross-section, of a single switch unit, according to the invention.

FIG. 1 shows a single switch unit 1 comprising dry reed switch 9, coils 5 and 6 having axial openings therethrough, magnetic member 7, and permanent magnet 8. For convenience in terminology the elements recited will be referred to hereinafter as follows: unit 1, switch 9, hold coil 5, select coil 6, shunt 7 and magnet 8. In addition, the elements of switch 9 will be designated hold reed 3, select reed 4 and envelope 2. The designations "hold" and "select" are derived from the crossbar switch art but have no functional significance here except that hold coil 5 is used to release switch 9 when magnet 8 is holding that switch in its operated condition (hold and select reeds 3 and 4 in electrical contact at the contact portions 3a and 4a thereof.)

Switch 9 is of the well-known dry reed type as shown, for example, in FIG. 1 of Patent 2,289,830, issued to W. B. Ellwood on July 14, 1942. Switch 9 consists of a gas-filled tubular envelope 2 of vitreous material having flexible magnetizable reeds 3 and 4 sealed into either end thereof. Flexible reeds 3 and 4 are of low electrical and magnetic impedance and may be composed of any suitable material, such as pure iron or iron-nickel alloy. Envelope 2 protects reeds 3 and 4 from corrosion by reactive agents such as oxygen. The atmosphere within envelope 2 may be composed of any non-corrosive gas such, for example, as helium, neon or argon. The portions of reeds 3 and 4 inside envelope 2 are cantilevered from the opposite ends thereof and are disposed approximately parallel to one another. Reeds 3 and 4 terminate within envelope 2 in spaced, overlapping relation to define contact gap 3a—4a therebetween. Hold and select reeds 3 and 4 have overlapping contact portions 3a and 4a; in addition, with reference to FIG. 1, hold reed 3 may be said to have a magnet portion where it is coextensive with magnet 8, a coil portion where it is coextensive with hold coil 5 and a poleface portion where hold reed 3 overlaps the linear poleface section 7a of shunt 7. The various portions of hold reed 3 are not necessarily mutually exclusive and the poleface portion, for instance, may include the contact portion. In FIG. 1, the designation 3a applies to the enclosed end of hold reed 3 generally and may be used hereinafter to refer to the contact portion or the poleface portion of hold reed 3, or both; the particular meaning to be attached to the symbol 3a will be apparent from the context in which it is used. The overlapping (contact) portions 3a and 4a of reeds 3 and 4 normally will be coated or impregnated with a suitable substance, such as gold, for instance, to ensure good contact characteristics. Portions 3b and 4b of reeds 3 and 4 extending without envelope 2 are terminals for connecting switch 9 to external electric circuits. For simplicity, the drawings show reeds 3 and 4 and envelope 2 to be of uniform composition and contour. As a practical matter, this generally will not be the case since envelope 2 may be pinched at the ends where it receives hold and select reeds 3 and 4 and since reeds 3 and 4 may themselves be structurally dissimilar and composed of different grades of metal for the portions within, outside of, and where sealed into the envelope.

One method of operating normally open (cooperating contact surface 3a and 4a are separated from each other) dry reed switch 9 is to create a magnetic potential difference between reeds 3 and 4 where they overlap at contact gap 3a—4a. When this potential difference is sufficiently great, or, alternatively, when sufficient magnetic flux flows across contact gap 3a—4a, internal reed ends 3a and 4a come together to make electrical contact, thereby electrically uniting the external circuits connected to the terminal portions 3b and 4b of reeds 3 and 4. Another method of operating switch 9 may consist in creating a magnetic potential of a chosen polarity on one reed end, such as 3a, and then repelling that reed end 3a toward the other, such as 4a, from an external source of magnetic potential of the same polarity. Either of the above methods may be used, and they may be employed concurrently.

Magnet 8 of unit 1 is aligned in parallel, spaced proximity with hold reed 3 so that the north pole of magnet 8 is closer to contact portion 3a of hold reed 3 than the south pole is. The shape of magnet 8 is not critical; however, the preferred embodiment most likely would be either cylindrical or parallelepipedal since permanent magnets having such forms are readily available commercially. Any suitable permanently magnetizable material, such as "Alnico V," for exmple, may be used to constitute the magnet.

Figure 2:
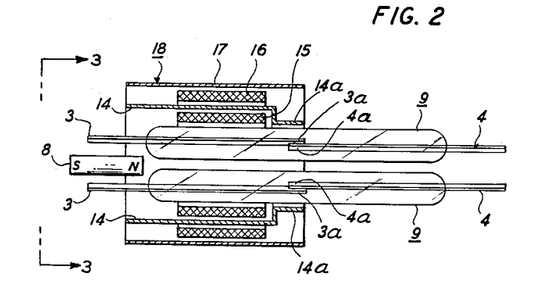
FIG. 2 is a view partially in cross-section, of a tubular multicontact assembly embodying the invention.
Figure 6:
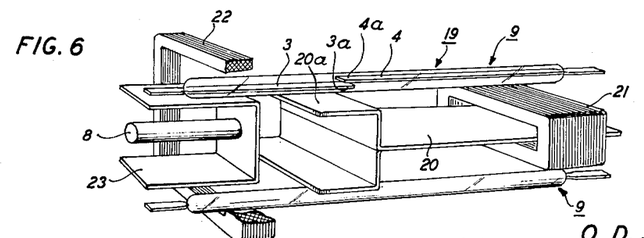
FIG. 6 is a perspective view of the interior of the structure of FIGS. 4 and 5.

Shunt 7 is of magnetic material, passes through the interior of select coil 6, and extends parallel to the longitudinal axis of switch 9. At a point beyond the left end (in FIG. 1) of hold coil 5, shunt 7 makes two right angle bends so that the end 7a thereof comes adjacent to envelope 2 and into spaced proximity with the end 3a of hold reed 3 and with the general contact gap area 3a—4a of switch 9. The various linear segments of shunt 7 may be designated the poleface section 7a, the intermediate section 7b and the coil section 7c, respectively. The shape and disposition of shunt 7 may be varied to suit particular design requirements, as shown in FIGS. 2 and 6, for instance, so long as it has an adjacent, or poleface, section 7a in the vicinity of contact gap 3a—4a and a displaced, or coil, section 7c whereabout may be disposed a flux generating means such as coil 6 of FIG. 1. Shunt 7 may be composed of any suitable low reluctance magnetic material such as iron.

Hold and select coils 5 and 6 surround hold reed 3 and shunt 7, respectively. The coils are composed of windings 10 and 12 and supporting spools 11 and 13 of a non-magnetic material such as polyethylene. In FIG. 1 spools 11 and 13 are shown to abut envelope 2 and shunt 7, respectively; it is not necessary that they do so, however, since the coil windings 10 and 12 may be maintained in their proper spatial relation to the other unit element by other means, such as external supports. In addition, the electrical wiring may be integrated into plastic matrices, thereby obviating the need for distinct support structure such as spools 11 and 13. Hold and select coils 5 and 6 are shown in cross-section to indicate that they encompass the respective elements 3 and 7. Since the purpose of coils 5 and 6 is to induce magnetic flux in these elements, it will be seen that the shapes of coils 5 and 6 are not critical within rather wide limits. Hold and select coils 5 and 6 may be round or square or even of an elongated rectangular shape such as are found in magnetically operable coordinate switches of the crossbar type.

Specific construction details have been omitted from FIG. 1 since the various elements comprising unit 1 may be maintained in their spatial, electrical and magnetic relationships by many methods well known in the art.

One aspect of the novelty of the present invention resides in the manner of utilizing the saturation characteristics of hold reed 3 and shunt 7 and in deploying the elements of unit 1 to define a flux or magnetomotive force (M.M.F.) divider network, ot produce an improved switching device. A general description of the operation of unit 1 will now be given, to be followed by consideration of the principles involved, particularly with reference to FIGS. 7 and 8.

Switch 9 cannot be operated by the energization of hold coil 5 alone. When hold coil 5 is energized in a sense tending to actuate switch 9, it assumes the same polarity as that indicated for magnet 8. By "same polarity" it is means that the magnetic field generated by electrical current flowing in the winding 10 of coil 5 is in the same direction as the magnetic field of permanent magnet 8. Magnetic flux will then be induced in hold reed 3 and will flow therein, according to the usual conventions, toward the switch gap 4a—3a—7a. This hold reed 3 flux will then divide between shunt 7 and select reed 4 in inverse proportion to the reluctances presented by these alternatives. The reluctance of the contact path via select reed 4 will be seen to consist of the reluctance of contact gap 3a—4a plus that of select reed 4 and that of the return path to hold coil 5. The reluctance of the shunt path consists of the reluctance of shunt gap 3a—7a plus that of shunt 7 and that of the return path to hold coil 5. According to the ratio of reluctances presented by these two flux paths, they will constitute a flux divider network as to flux emanating from hold reed 3 due to the energization of hold coil 5. Another way of considering the phenomenon is to view the adjacent portions 3a, 4a and 7a of hold and select reeds 3 and 4 and shunt 7 as an M.M.F. divider with the magnetic potential difference between hold reed 3 and elements 4 and 7 being directly proportional to the magnetic flux flowing therebetween. It will be noted that flux induced in hol dreed 3 by magnet 8 is in series aiding with that from hold coil 5 and therefore makes a quantitative contribution to the aforementioned phenomenon. This contribution is not controlling when only one coil is energized, however, and will be dealt with hereinafter when the latching feature of unit 1 is discussed.

With the flux generated in hold reed 3 by hold coil 5 energized alone passing through the flux divider network is indicated, increased energization of hold coil 5 might be expected to result in the proportion of magnetic flux crossing contact gap 3a—4a between hold and select reeds 3 and 4 being sufficient to operate switch 9. This never occurs, however, due to the saturation characteristic of hold reed 3 which limits the amount of flux carried thereby to a certain maximum value. The flux divider network is therefore arranged so that the flux crossing contact gap 3a—4a will be insufficient to operate switch 9 when saturation flux is carried by hold reed 3. The result of this correlation between the saturation characteristic of hold reed 3 and the flux divider network is that no degree of energization of hold coil 5 will, of itself, suffice to operate switch 9.

Select coil 6 is also ineffective, when energized alone, to operate switch 9. As in the case of hold coil 5, when select coil 6 is energized in a manner tending to operate switch 9, it is poled in the same sense as magnet 8; that is, the magnetic flux generated coil 6 flows in shunt 7 toward the switch gap 4a—3a—7a. Again, a flux dividing effect is realized in the vicinity of the switch gap 4a—3a—7a and the flux emanating from shunt 7 at the poleface section 7a thereof will divide between hold and select reeds 3 and 4 in inverse proportion to the reluctances presented by these alternatives. In this case, however, another aspect of the flux divider must be considered. The flux between hold and select reeds 3 and 4 at contact 3a—4a, and thus the force of attraction therebetween, is the critical factor. Since the reluctances existing between shunt 7 and hold and select reeds 3 and 4, respectively, will be different, a magnetic potential difference will exist between the hold and select reeds 3 and 4 themselves, giving rise to a certain amount of flux in contact gap 3a—4a. The flux divider network, as to flux in shunt 7, is therefore constituted so that when saturation flux is generated in shunt 7 by select coil 6 energized alone, insufficient flux will flow between hold and select reeds 3 and 4 to actuate switch 9. Thus, no degree of energization of select coil 6 alone will be effective to operate switch 9.

Three factors influencing the operation of unit 1 are flux leakage, reed stiffness, and the relative positions of hold and select reeds 3 and 4 with respect to shunt 7. A certain amount of flux leakage is inherent in the operation of unit 1, as it is in almost all magnetic circuits. The principal effect of such leakage is to decrease efficiency; this may be quite readily controlled, however, by employing shielding to control the flux return paths as in FIG. 4 and by locating hold and select coils 5 and 6 nearer the switch gap 4a—3a—7a as in FIG. 2.

In the foregoing description of the flux divider network, it was implicitly assumed that flexible reeds 3 and 4 remained in their unoperated positions when either of the hold and select coils 5 and 6 was energized alone. There will, however, be a certain amount of reed bending caused by the magnetomotive forces created among hold reed 3, select reed 4 and shunt 7. The reed deflections thus realized alter the various reluctances of the flux divider network and may be used to improve the operation of unit 1.

The degree of reed deflection will depend upon the reed stiffness, the relative positions of the unit elements, and the amount of flux flowing among shunt 7 and the two reeds 3 and 4. For a given unit configuration, the maximum deflection attainable when either coil is energized alone will occur when the element encircled by that coil is saturated. When the unit elements are disposed so that the deflection so realized increases the separation of the hold and select reeds 3 and 4 at the contact gap 3a—4a, and thus increases the reluctance of that portion of the flux divider network, this aspect of the unit 1 behaviour aids in rendering unit 1 non-operable by one coil alone. Such a provision relaxes the tolerances on the flux divider network and increases the efficiency of unit 1. In FIG. 1, the element disposition necessary is one wherein, when only one coil is energized, the force attracting hold reed 3 to shunt 7 at the shunt gap 3a—7a is greater than the sum of the interreed attractive force at the contact gap 3a—4a and the force of attraction between select reed 4 and shunt 7 across the gap 4a—7a. To achieve such a relationship of forces, the reluctance between hold reed 3 and shunt 7 at shunt gap 3a—7a has been made low by placing these elements adjacent to one another and overlapping to a substantial extent. The flux return paths beyond the general area of the switch gap 4a—3a—7a of switch 9 may also be adjusted to render the reluctance of shunt gap 3a—7a low with respect to the other reluctances of the flux divider network.

Placing hold reed 3 closer than select reed 4 to shunt 7, as is shown in FIG. 1, helps in taking advantage of the reed flexibility to prevent single coil operation. This arrangement is also preferable for operating the switch with both coils energized, since a force of repulsion, which aids in closing the switch contacts, exists at shunt gap 3a—7a. Adjustment of the reluctance between hold reed 3 and shunt 7 is more easily performed when select reed 4 is not interposed between them.

As a result of the magnetic flux divider network created by the configuration of magnetic elements in unit 1, the described two-coil unit may be designated "semi-marginal," in the sense that dry reed switch 9 may not be operated by the energization of either hold coil 5 or select coil 6 alone. The configuration of FIG. 1 also yields advantages in switch actuation which will now be described.

To actuate switch 9 of unit 1, hold and select coils 5 and 6 must be energized concurrently above certain minimum levels. When this is done, the magnetic flux in hold reed 3 emanating from hold coil 5 and that in shunt 7 emanating from select coil 6, oppose each other at shunt gap 3a—7a. Consequently, like magnetic poles are there created and the force of magnetic repulsion thereat tends to force hold reed 3 against select reed 4 at contact gap 3a—4a. In addition, magnetic attraction between select reed 4 and elements 3 and 7, respectively, causes the flexible reeds 3 and 4 to tend to move toward one another. The forces described cooperate to cause electrical contact to be made between hold and select reeds 3 and 4 at contact gap 3a—4a. Alternatively, the raised magnetic potential of shunt 7 may be viewed as effecting the actuation of switch 9 by diverting more of the hold reed 3 flux through the contact gap 3a—4a than would be the case were hold coil 5 energized alone.

That hold and select coils 5 and 6 must be energized above minimum levels to effect switch actuation follows, of course, from the fact that neither coil can accomplish this result when energized alone. From an electrical operating circuit standpoint, these minimum levels correspond to minimum coil currents. The necessary currents may be reduced, as above noted, by shielding unit 1 and by locating hold and select coils 5 and 6 nearer switch gap 4a—3a—7a to reduce the amount of leakage flux.

The cross-sectional area of shunt 7 in FIG. 1 is greater than that of hold reed 3. For this reason, hold reed 3 will saturate at a lower value of magnetic flux flowing therein than will shunt 7. A practical consequence of this is to give unit 1 a wide operating margin, the limits of which may be well defined. This is achieved by making switch 9 actuable only when hold reed 3 is at or near saturation; that is, when the M.M.F. produced by hold coil 5 is at or near a particular minimum value. To actuate switch 9 when that minimum hold coil 5 M.M.F. exists, a corresponding minimum M.M.F. must be generated by select coil 6. Since hold reed 3 is at or near saturation at this point, it will be seen that any hold coil 5 M.M.F. greater than the particular minimum value referred to will actuate switch 9. Furthermore, for any hold coil 5 M.M.F. equal to or greater than the minimum specified, and select coil 6 M.M.F. equal to or greater than the corresponding minimum referred to, up to and beyond that necessary to saturate shunt 7, will likewise actuate switch 9. Hold reed 3 has been referred to as the element operated at or near saturation for switch actuation; the magnetic shunt element 7 would also serve this purpose. As a practical matter, however, hold reed 3 will generally be of rather small cross-section as dictated by its mechanical function and will thus have a lower (than shunt 7) saturation point which can be attained with low power expenditure.

Thus, in addition to the semi-marginal characteristic described hereinbefore, unit 1 has well-defined operating margins. From an operating circuit standpoint, this means that a wide variation in coil currents is permissible, limited only by the definable minimum currents referred to above.

The purpose of magnet 8 is to provide unit 1 with a latching feature whereby switch 9, actuated as described, may be held in that condition with hold and select coils 5 and 6 deenergized. It is possible, of course, to hold switch 9 actuated without using magnet 8. This could be achieved by tapping winding 10 or by operating it at low current so as to maintain sufficient flux through the closed contact gap 3a—4a to prevent reeds 3 and 4 from springing apart. Such current would be less than the minimum hold coil 5 current referred to above. This means of holding reeds 3 and 4 in contact is inefficient, however, as it constitutes a power drain on the electrical operating circuit. Magnet 8 is provided, therefore, poled in the sense indicated, to cause sufficient magnetic flux to flow in hold reed 3 to latch switch 9 actuated. The strength of the magnetic field of magnet 8 is not critical so long as it is neither so strong on the one hand as to cause switch 9 to operate with select coil 6 alone energized, nor so weak on the other hand as to be incapable of holding reeds 3 and 4 joined. Switch 9, if held by magnet 8, may be released by a current pulse of reverse (relative to the operating current direction) polarity applied to the winding of hold coil 5. Since the latching magnet 8 may be relatively weak to perform its holding function, it will normally have but little influence on the switch 9 actuation and on the semi-marginal characteristics described hereinbefore.

Figure 3:
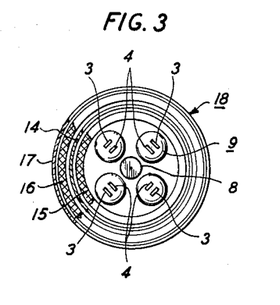
FIG. 3 is an end view of the assembly of FIG. 2 looking in the direction of arrows 3—3 of FIG. 2.

FIGS. 2 and 3 are views of a device illustrative of how the present invention may be embodied in a multi-contact assembly. Assembly 18 comprises a tubular shield 17 of low reluctance magnetic material, a tubular select coil 16, a tubular shunt 14 of low reluctance magnetic material having a poleface section 14a of reduced diameter, a tubular hold coil 15, four dry reed switches 9 disposed symmetrically about and parallel to the axis of the tubular construction, and a latching permanent magnet 8 concentric with the axis referred to. Switches 9 have hold and select reeds 3 and 4 with hold reeds 3 lying within hold coil 15 and adjacent the poleface section 14a of shunt 14. The external surface of magnet 8 is radially symmetrical with respect to reeds 3 and is poled as indicated.

Again, specific construction details are omitted since assembly of the device described may be achieved in many ways, obvious to those skilled in the art.

It will be noted that the compact structure of assembly 18 is well adapted to modular design techniques and could be used, for instance, as a plug-in crosspoint unit for a printed wiring crossbar switch. The presence of magnetic shield 17 and the location of select coil 16 contribute to an increase in efficiency by making the flux paths shorter and through lower reluctance media.

Assembly 18 is only a particular packaging arrangement for a plurality of switches 9. It is obvious that multi-switch assemblies according to the invention may take a wide variety of forms including, for instance, that of a cross-coil, magnetically operated, coordinate switch of the crossbar type.

Figure 4:
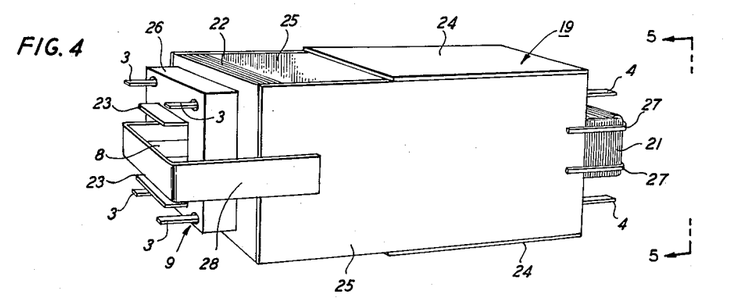
FIG. 4 is a perspective view of the exterior of a mechanical structure embodying the invention.
Figure 5:
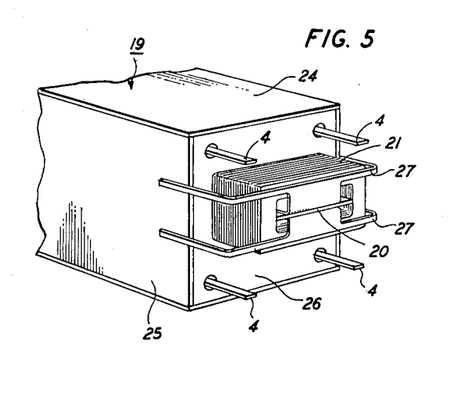
FIG. 5 is an end view, in perspective of the structure of FIG. 4 looking in the general direction of arrows 5—5 of FIG. 4.

FIGS. 4, 5 and 6 show a more sophisticated incorporation of the inventive concept in the form of shielded, multi-contact assembly 19. Assembly 19 is composed as follows: Four glass-sealed switches 9 disposed parallel to the longitudinal axis of assembly 19, each such switch having hold and select reeds 3 and 4 defining a contact gap 3a—4a; a rectangular hold coil 22 enclosing hold reeds 3 for generating magnetic flux therein; a cylindrical permanent magnet 8 centrally located with respect to hold reeds 3 and parallel thereto; a U-shaped sheet-iron pole-piece 23 for conveying magnetic flux from one pole of magnet 8 into proximity with hold reeds 3; an iron magnetic shunt member 20 extending along the longitudinal axis of assembly 19 and branching into spaced proximity with hold and select reeds 3 and 4 and the contact gaps 3a—4a defined thereby; a rectangular select coil 21 surrounding the unbranched portion of shunt 20 for generating magnetic flux therein; vertical iron shielding plates 25 covering the sides of the assembly; horizontal iron shielding plates 24 extending from select coil 21 to the contact gap 3a—4a location; an iron return member 28 for connecting the external pole of magnet 8 to shielding plates 25; iron shunt return members 27 for connecting the select coil section of shunt 20 to shielding plates 25; and two fiber blocks 26 in the ends of assembly 19 for electrically insulating the several reeds 3 and 4 and for maintaining the various components of assembly 19 in their proper spatial relationships.

Although elements 23, 24, 25, 27, 28 have been referred to as being composed of iron, any material of similar magnet properties would serve equally well to define low reluctance paths for magnetic flux and thus increase the efficiency of operation of assembly 19. Similarly, supporting blocks 26 need only be non-magnetic and capable of performing their insulating and structural functions. The various components may be joined in the configuration indicated in any one of a number of ways well known in the art.

Figure 7:
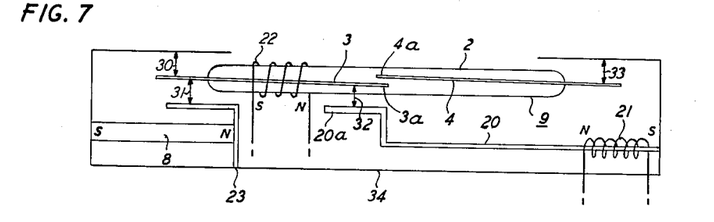
FIGS. 7 and 8 are diagrammatic and magnetic circuit representations, respectively, of a single unit according to the invention and are useful in explaining the theory and operation thereof.

For one explanation of the operating principles of the devices previously described, with special accent on assembly 19 (FIGS. 4, 5 and 6), reference will now be made to the schematic drawing of FIG. 7 and the magnetic circuit of FIG. 8. These figures are believed to accurately represent to a first approximation the principles and elements involved in the assembly operation but are included here for explanatory purposes only. In FIG. 7, a representative dry reed switch 9 of assembly 19 is used to simplify the description.

Figure 8:
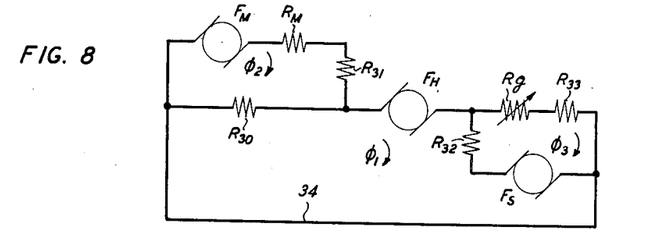

The symbols used in FIGS. 7 and 8, not already explained, have the following significance: $\phi_1$ is the total magnetic flux in hold reed 3; $\phi_2$ is the flux in hold reed 3 due to magnet 8; $\phi_3$ is the flux between hold and select reeds 3 and 4 at contact gap 3a—4a; $F_M$ is the M.M.F. of magnet 8; $F_H$ is the M.M.F. of hold coil 22; $F_S$ is the M.M.F. of select coil 21; 34 designates outer shielding which serves as a magnetic ground in the magnetic circuit; $R_M$ is the reluctance of magnet 8 and pole-piece 23; $R_{30}$ is the reluctance between shielding 34 and hold reed 3; $R_{31}$ is the reluctance between pole-piece 23 and hold reed 3; $R_{32}$ is the reluctance between hold reed 3 and shunt 20; $R_{33}$ is the reluctance between select reed 4 and shielding 34; and $R_g$ is the reluctance of the contact gap 3a—4a between hold and select reeds 3 and 4. The numbered arrows of FIG. 7 represent hypothetical dimensions and give significance to the R subscripts of FIG. 8. These dimensions are to be taken figuratively, however, since the various reluctances are actually distribution phenomena and, in addition, there is the matter of leakage flux which is not amenable to such simple representation.

With the magnetic flux sources poled in the senses indicated, the various flux currents will be positive. For the purposes of discussion, it will be assumed that the reluctances are linear below saturation and that $R_g$, the reluctance of contact gap 3a—4a, assumes only two values; zero when hold and select reeds 3 and 4 are in contact, and a particular finite value when hold and select reeds 3 and 4 are in their normally separated condition. Magnet 8 is shown to be poled so that the flux therefrom induced in hold reed 3 will be in series aiding with that from hold coil 22. This flux is not controlling on the switch actuation however, so, until the switch latching feature is discussed, flux $\phi_2$ will be ignored and both $F_M$ and $R_M$ will be considered large enough so that this branch of the magnetic network may be disregarded at this time.

When hold coil 22 is energized in the sense indicated, flux therefrom will flow in hold reed 3 and will divide between select reed 4 and shunt 20. Until hold reed 3 saturates, increasing the flux flowing therein will increase proportionally the flux flowing in the branches of the flux divider network. This flux will divide in the ratio $R_{32} : R_g + R_{33}$ and the contact gap 3a—4a flux $\phi_3$ will be $$\frac{R_{32}}{R_g + R_{33}} \phi_1$$

In order that switch 9 will not operate due to the energization of hold coil 22 alone, it is necessary that the reluctances $R_{33}$, $R_g$ and $R_{32}$ constitute a flux dividing arrangement such that for any value of $\phi_1$ equal to or less than the hold reed 3 saturation flux $\phi_{1S}$, $\phi_3$ as determined by the above relation will never be of sufficient magnitude to cause reeds 3 and 4 to make electrical contact with each other at contact gap 3a—4a. When commercially available dry reed switch units are employed, both $R_g$ and $\phi_{1S}$ will be determined by the construction of switch 9 and only $R_{32}$ and $R_{33}$ will be controllable. Of these, $R_{32}$ is the most important and it may be adjusted by varying any one or more of the following: the cross section of shunt 20, the permeability of the magnetizable material constituting shunt 20, the spacing of shunt gap 3a—20a (indicated by arrow 32 in FIG. 7), and the area of the shunt poleface section 20a adjacent to hold reed 3. The location of magnetic shunt 20 outside the vitreous envelope 2 of switch 9 not only permits easy adjustment of $R_{32}$ for any particular assembly configuration; it also gives the designer considerable latitude in his choice of assembly elements and, by making the shunt 20 adjustable, the assembly can be adapted to different operating conditions, permanent magnet strengths, types of dry reed switches, etc. $R_{33}$ may vary within wide limits according to the particular switch assembly employed. Where the switch is shielded, as in assembly 19 (FIGS. 4, 5 and 6), $R_{33}$ may be readily adjusted by varying the magnetic linkage between select reed 4 and the magnetic shield, such as element 17 of FIGS. 2 and 3 or element 34 of FIG. 7. In an unshielded assembly, such, for instance, as unit 1 of FIG. 1, $R_{33}$ would be a fixed proportion of the select reed 4-to-hold coil 5 (see FIG. 1) return path reluctance. If, instead of employing commercially available dry reed switches, designers are free to prescribe the characteristics of all of the assembly elements, then the two parameters $R_g$ and $\phi_{1S}$ can and must be taken into account. $\phi_{1S}$ is a direct function of the material of hold reed 3 and its cross-sectional area, and $R_g$ depends upon the spacing of contact gap 3a—4a and the extent to which reeds 3 and 4 overlap.

When coil 21 is energized alone, the flux therefrom will divide between hold and select reeds 3 and 4 as previously discussed in connection with FIG. 1. From the circuit drawing of FIG. 8, it will be seen that the flux $\phi_3$ in contact gap 3a—4a, in terms of the flux $(\phi_3-\phi_1)$ in shunt 7 (FIG. 1) will be $$\frac{R_{30}}{R_g+R_{33}}(\phi_3-\phi_1)$$

In order to prevent the switch from operating, the flux divider network constituted by reluctances $R_{30}$, $R_g$ and $R_{33}$ must limit $\phi_3$ below the switch actuation value, according to the above relation, for any value of $(\phi_3-\phi_1)$ less than or equal to the shunt saturation flux $(\phi_3-\phi_1)_S$. The shield-to-read reluctances $R_{30}$ and $R_{33}$, indicated by arrows 30 and 33 of FIG. 7, may be readily varied, as may the shunt saturation flux $(\phi_3-\phi_1)_S$. If commercially available dry reed switches are employed, $R_g$ will be fixed, otherwise it may also be adjusted by varying the normal displacement 3a—4a between hold and select reeds 3 and 4 and by varying the extent to which these reeds overlap.

It will be noted that the magnetic circuit represents the reluctance $R_{32}$ as existing between shunt 20 and hold reed 3; this is also indicated by arrow 32 of FIG. 7. There will be a certain amount of flux linkage between the shunt 20 and select reed 4, but it has been found that better results are obtained when the reluctance of shunt gap 20a—4a is considerably greater than that of shunt gap 20a—3a. The shunt 20-to-select reed 4 flux path has therefore been disregarded as a first approximation.

The orientation of hold and select reeds 3 and 4 with respect to shunt 20 may contribute significantly toward attaining efficient semi-marginal operation and relaxing tolerances on the reluctances of the flux divider network. When hold reed 3 is closer to shunt 20 than select reed 4 is, as shown in FIG. 7, advantage may be taken of the flexibility of reeds 3 and 4. It will be seen that when either of select and hold coils 21 and 22 is energized alone, more flux will tend to flow between hold reed 3 and shunt 20 than between reed 4 and shunt 20. Physically, this means that hold reed 3 will experience an attraction toward shunt 20 and will bend theretoward more than will select reed 4, increasing $R_g$, and thus increasing the magnitude of $\phi_3$ necessary to actuate switch 9. The assumption made previously that $R_g$ is of a particular finite value when switch 9 is unoperated must therefore be modified to the extent that advantage is taken of the flexibility of hold and select reeds 3 and 4 in attaining semi-marginal operation.

From the magnetic circuit of FIG. 8, it will be readily apparent how M.M.F.'s $F_H$ and $F_S$, when generated concurrently by coils 22 and 21 respectively, oppose at shunt gap 3a—20a and cooperate to increase the gap flux $\phi_3$, thus causing switch 9 to operate. With respect to flux produced by hold coil 22, the effect of the concurrent energization of select coil 21 may be viewed as increasing the $R_{32}$ factor in the flux dividing relation given above for hold coil 22 energized alone. Similarly, the $R_{30}$ factor in the flux dividing ratio for select coil 21 energized alone may be viewed as increasing due to the concurrent energization of hold coil 22. From another standpoint, previously mentioned, the switch operation may be regarded as the result of the cooperation of the force of attraction between the oppositely poled hold and select reeds 3 and 4 and the force of repulsion between the similarly poled reed 3 and shunt 20.

In order that switch 9 operate, $F_H$ and $F_S$ must not only be active concurrently; they must also be equal to or greater than certain minimum strengths $F_{HM}$ and $F_{SM}$. These minimum strengths, corresponding to minimum ampere-turns of hold and select coils 22 and 21 respectively, may be controlled by varying the efficiency of assembly 19; that is, by regulating the amount of leakage flux therein. By increasing the magnetic efficiency of assembly 19, $F_{HM}$ and $F_{SM}$ are reduced. Less leakage flux, and hence greater efficiency, may be obtained by shielding the assembly, by placing select and hold coils 21 and 22 closer to the contact portion of switch 9, and by associating these coils more intimately with their respective axially positioned magnetic elements. Also, since flux from permanent magnet 8 is in series aiding with that from hold coil 22, the minimum ampere-turns of hold coil 22 may be varied by controlling the strength of permanent magnet 8.

By making the value of $F_{HM}$ such that, in cooperation with $F_M$, a value of flux $\phi_1$ is induced in hold reed 3 which is at or near the saturation flux $\phi_{1S}$ for that reed 3, the operating characteristics of dry reed switch 9 may be accurately defined. If this is done, $F_{HM}$ and $F_{SM}$ will be nearly invariant and a plot of $F_H$ versus $F_S$ in Cartesian coordinates will yield a right-angle operating characteristic defined by $F_{HM}$ and $F_{SM}$. Although switch assembly 19 need not be designed to provide this characteristic, it will be an advantage in applications where wide operating margins are desired or where minimum coil currents must be employed and the tolerances thereon are small. Shunt 20 could be made the saturated element instead of hold reed 3 for the purpose of obtaining the right-angle operating characteristic; but the use of hold reed 3 is preferable since it will ordinarily be of smaller cross-section than shunt 20 and thus saturable with less power expenditure, and, also, the presence in hold reed 3 of flux from magnet 8 permits a relatively low value of $F_{HM}$ to be employed.

As previously mentioned, permanent magnet 8 serves a latching function. The limits imposed upon the contribution that this element 8 makes to the behaviour of switch 9 are determined by its latching function on one hand and its compatibility with the semi-marginal characteristic of switch 9 on the other. In order to hold switch 9 operated with hold and select coils 22 and 21 deenergized, magnet 8 must supply sufficient magnetic flux so that the portion thereof passing through the closed contact gap 3a—4a will maintain this union. When switch 9 is in its operated condition and hold and select coils 22 and 21 are deenergized, the only magnetic flux source in the magnet circuit will be $F_M$. The portion of $\phi_2$ induced in hold reed 3 will then be divided in a passive network consisting of reluctances $R_{30}$, $R_{32}$, $R_{33}$ and $R_g$. $R_g$, indicated as being variable, will be essentially zero since contact gap 3a—4a is closed. The working flux will be that passing through $R_g$ and $R_{33}$. Although $R_{32}$ will be of somewhat greater magnitude than when switch 9 is in its unoperated condition, this factor must still be considered in determining the minimum permissible strength of magnet 8. Thus, the portion of the flux divider network comprised of reluctances $R_{32}$, $R_{33}$ and $R_{30}$, will determine the strength and location of magnet 8 necessary to maintain enough flux through $R_{33}$ to hold switch 9 operated (contact gap 3a—4a closed). Mathematically, in terms of the enumerated reluctances and the minimum value $\phi_{3M}$ of $\phi_3$ sufficient to hold switch 9 operated, the lower limit on the flux $\phi_2$ generated by magnet 8 will be $$\phi_2 = \frac{R_{33}^2}{R_{30}(R_{32}+R_{33})}\phi_{3M}$$

The other, upper, limit on the flux contribution by magnet 8 is that it must not be so great that the unoperated switch 9 will operate when select coil 21 is energized alone. In terms of M.M.F.'s, this means that $F_M$ must not be so great as to reduce to zero the minimum hold coil 22 operating strength $F_{HM}$.

A considerable amount of latitude exists between the two limits referred to above; and there are a number of parameters which may be varied in accommodating the permanent magnet 8 to the structure and function of switch 9. The strength of magnet 8 is the most obvious variable. In addition, the physical arrangement of assembly elements, including permanent magnet 8, may be adjusted in a number of ways. The elements comprising the various reluctances in FIG. 8 are susceptible of change to the extent that such change does not interfere with the requirement of semi-marginal operation.

The above discussion presents one theory of the principles underlying the operation of the disclosed device and is set forth as an attempt to clarify the probable reasons behind the advantages displayed thereby. This discussion is believed to be accurate but is for explanatory purposes only and not to be interpreted as limiting the scope of the instant invention in any way.

It is to be understood that the above described arrangements are merely illustrative of the application of the principles of the invention. Numerous other arrangements may be devised by those skilled in the art without departing from the spirit and scope of the invention.

What is claimed is:

1. A switching device comprising first and second magnetic members, portions thereof being disposed in a normally spaced adjacent relationship to define a contact gap therebetween, first means to cause magnetic flux to flow in said first member, magnetic shunt means so disposed with respect to said members as to define a shunt gap with each, said shunt gaps and said contact gap constituting a flux divider network, separate means to cause magnetic flux to flow in said shunt means, and means including said flux divider network for inhibiting the operation of said device when either of said means to cause is energized alone and for operating said device when both of said latter means are energized concurrently.

2. A switching device comprising first and second flexible magnetic members, portions thereof being disposed in a normally spaced adjacent relationship to define a contact gap therebetween and arranged to make electric contact therebetween at said gap under the influence of magnetic flux, first means to cause magnetic flux to flow in said first member, magnetic shunt means so disposed with respect to said members as to define a shunt gap with each, said shunt gaps and said contact gap constituting a reluctive flux divider network, separate means to cause magnetic flux to flow in said shunt means, and means including said flux divider network for inhibiting the operation of said device when either of said means to cause is energized alone and for operating said device when both of said latter means are energized concurrently.

3. A switching device comprising an envelope, first and second flexible magnetic members respectively sealed into said envelope, portions of said members within said envelope being disposed in a normally spaced adjacent relationship to define a contact gap therebetween and arranged to make electric contact with each other at said gap under the influence of magnetic flux, first means to cause magnetic flux to flow in said first member, magnetic shunt means defining a reluctive flux divider network with said members, separate means to cause magnetic flux to flow in said shunt means, and means including said flux divider network for inhibiting the operation of said device when either of said means to cause is energized alone and for operating said device when both of said latter means are energized concurrently.

4. A switching device comprising an elongated envelope, first and second flexible magnetic members respectively sealed into opposite ends of said envelope, portions of said members within said envelope being disposed in a normally spaced adjacent relationship to define a contact gap therebetween and arranged to make electric contact with each other at said gap under the influence of magnetic flux, first means to cause magnetic flux to flow in said first member, magnetic shunt means outside said envelope defining a reluctive flux divider network with said members, separate means to cause magnetic flux to flow in said shunt means, and means including said flux divider network for inhibiting the operation of said device when either of said means to cause is energized alone and for operating said device when both of said latter means are energized concurrently.

5. A magnetic reed contact switching device comprising an elongated envelope of vitreous material having first and second flexible members of magnetic material respectively sealed into opposite ends thereof, portions of said members within said envelope being disposed in a normally spaced adjacent relationship to define a contact gap therebetween and arranged to make electric contact with each other at said gap under the influence of magnetic flux, first generating means to cause magnetic flux to flow in said first member, magnetic shunt means outside said envelope and adjacent thereto defining a magnetic flux dividing network with said members, separate generating means to cause magnetic flux to flow in said shunt means, and means including said flux divider network for inhibiting the operation of said contact device when only one of said generating means is energized.

6. A magnetic reed contact switching device comprising an elongated envelope of vitreous material having first and second flexible members of magnetic material respectively sealed into opposite ends thereof, portions of said members within said envelope being disposed in a normally spaced adjacent relationship to define a contact gap therebetween and arranged to make electric contact with each other at said gap under the influence of magnetic flux, first generating means to cause magnetic flux to flow in said first member, permanent magnet latching means causing magnetic flux to flow in said first member, magnetic shunt means outside said envelope and adjacent thereto defining a magnetic flux dividing network with said members, separate generating means to cause magnetic flux to flow in said shunt means, and means including said flux divider network for inhibiting the operation of said contact device when only one of said generating means is energized.

7. A magnetic reed contact switching device comprising a closed cylindrical envelope of vitreous material having first and second flexible members of low reluctance magnetic material respectively sealed into opposite ends of said envelope, contact portions of said members within said envelope being disposed in a normally spaced adjacent relationship to define a contact gap therebetween and arranged to make electric contact with each other at said gap under the influence of magnetic flux, coil and magnet portions of said first member, a first generating coil disposed about said coil portion for causing magnetic flux to flow in said first member, permanent magnet latching means adjacent said magnet portion for causing magnetic flux to flow in said first member, a magnetic shunt of low reluctance magnetic material external to said envelope and adjacent to the contact portion of said first member, a second generating coil disposed about a section of said shunt for causing magnetic flux to flow therein, and means including said shunt and said members for determining magnetic paths linked with said generating coils according to predetermined reluctive impedance ratios.

8. A magnetic reed contact switching device comprising a closed cylindrical envelope of vitreous material having first and second flexible members of low reluctance magnetic material respectively sealed into opposite ends thereof, said first member having a coil portion, a magnet portion and a pole-face portion, contact portions of said members within said envelope being disposed in a normally spaced adjacent relationship to define a contact gap therebetween and arranged to make electric contact with each other at said gap under the influence of magnetic flux, a first generating coil disposed about said coil portion for causing magnetic flux to flow in said first member, permanent magnet latching means adjacent said magnet portion causing magnetic flux to flow in said first member, a magnetic shunt of low reluctance magnetic material external to said envelope and having a pole-face section and a coil section, said pole-face section being disposed adjacent the pole-face portion of said first member, a second generating coil disposed about said coil section for causing magnetic flux to flow in said shunt, and means including said shunt and said members for determining magnetic paths linked with said generating coils according to predetermined reluctive impedance ratios, whereby said members make electrical contact with each other only when said generating coils are concurrently energized above certain minimum levels.

9. A magnetic reed contact switching device comprising a closed cylindrical envelope of vitreous material having first and second flexible members of low reluctance magnetic material respectively sealed into opposite ends thereof, said first member having a coil portion, a magnet portion and a pole-face portion, contact portions of said members within said envelope being disposed in a normally spaced adjacent relationship to define a contact gap therebetween and arranged to make electric contact with each other at said gap under the influence of magnetic flux, a first spool of non-magnetic material disposed about said coil portion, a first generating coil wound on said first spool for causing magnetic flux to flow in said first member, said first coil being energizable to saturate said first member, permanent magnet latching means adjacent said magnet portion causing magnetic flux to flow in said first member, a magnetic shunt of low reluctance magnetic material external to said envelope and having a pole-face section and a coil section, said pole-face section being disposed adjacent the pole-face portion of said first member, a second spool of non-magnetic material disposed about said coil section, a second generating coil wound on said second spool for causing magnetic flux to flow in said shunt, said second coil being energizable to saturate said shunt, shielding means of low reluctance magnetic material and magnetically associated with said shunt and said members, and flux divider means including said shunt and said members and said shielding means for determining magnetic paths linked with said coils according to predetermined reluctive impedance ratios, whereby said members make electrical contact with each other only when said coils are concurrently energized above certain minimum levels.

10. A magnetic reed contact switching device comprising a closed cylindrical envelope of vitreous material having first and second flexible members of low reluctance magnetic material respectively sealed into opposite ends thereof, said first member having a pole-face portion and a magnet portion and having a coil portion intermediate said pole-face portion and said magnet portion, contact portions of said members within said envelope being disposed in a normally spaced adjacent relationship to define a contact gap therebetween and arranged to make electric contact with each other at said gap under the influence of magnetic flux, said contact portion of said first member being included in said pole-face portion, a first spool of non-magnetic material disposed about said coil portion, a first generating coil wound on said first spool and normally energizable to cause magnetic flux to flow in said first member toward said contact gap and energizable to cause magnetic flux to flow in said first member away from said contact gap, said first coil being energizable to saturate said first member, a permanent magnet adjacent said magnet portion causing sufficient magnetic flux to flow in said first member toward said contact gap to hold said members in electrical contact when once so joined, a Z-shaped magnetic shunt of low reluctance magnetic material external to said envelope and having first and second end sections and an intermediate section, said first end section being disposed parallel to said envelope and adjacent said pole-face portion, a second spool of non-magnetic material disposed about said second end section, a second generating coil wound on said second spool for causing magnetic flux to flow in said shunt through said intermediate section toward said first end section, said second coil being energizable to saturate said shunt, shielding means of low reluctance magnetic material for defining low reluctance return paths for magnetic flux generated by said coils and said permanent magnet, and flux divider means comprised of said shunt and said members and said shielding means for determining magnetic paths linked with said coils according to predetermined reluctive impedance ratios, whereby said members make electrical contact with each other only when said coils are concurrently energized above certain minimum levels.

11. A switching device comprising tubular envelope means, first and second flexible magnetic member means, portions of said member means being disposed inside said envelope means in a normally spaced adjacent relationship to define a contact gap arrangement therebetween, first tubular coil means disposed about said first member means, tubular shunt means disposed about said first coil means, and second tubular coil means disposed about said shunt means.

12. The invention claimed in claim 11 wherein tubular shield means is disposed about said second coil means, and wherein said shunt means, said member means and said shield means determine magnetic paths linked with said coil means according to predetermined reluctive impedance ratios.

13. A switching device comprising tubular envelope means having first and second flexible magnetic member means respectively sealed in and extending through opposite ends of said envelope means, contact portions of said member means within said envelope means being disposed in a normally spaced adjacent relationship to define a contact gap arrangement therebetween and arranged to make electric contact with each other under the influence of magnetic flux, first coil means to cause magnetic flux to flow in said first member means, shunt means defining shunt gaps with said member means, said contact gap arrangement and said shunt gaps constituting a reluctive flux divider network, and second coil means to cause magnetic flux to flow in said shunt means.

14. The invention claimed in claim 13 wherein said first coil means is tubular and is disposed about and is energizable to saturate said first member means, wherein said shunt means is tubular and is disposed about said first coil means, and wherein said second coil means is tubular and is disposed about and is energizable to saturate said shunt means.

15. The invention claimed in claim 14 wherein said shunt means has a reduced section adjacent the contact portion of said first member means and a coil section coextensive with said second coil means, wherein tubular shield means is disposed about said second coil means, wherein permanent magnet latching means is disposed adjacent said first member means, and wherein said member means, said shunt means and said shield means are composed of low reluctance magnetic material.

16. The invention claimed in claim 15 wherein said latching means is so disposed as to cause magnetic flux to flow in said first member means and toward the contact portion thereof, wherein said first member means has a pole-face portion including said contact portion coextensive with the reduced section of said shunt means, wherein said first member means has a magnet portion coextensive with said latching means, wherein said first member means has a coil portion intermediate said pole-face portion and said magnetic portion and coextensive with said first coil means, wherein said first coil means is energizable in one manner to cause magnetic flux to flow in said first member means and toward said contact portion and is energizable in another manner to cause magnetic flux to flow in said first member means and away from said contact portion, wherein said second coil means is energizable to cause magnetic flux to flow in said shunt means and toward said reduced section, and wherein said shunt means, said member means and said shield means determine magnetic paths linked with said coil means according to predetermined reluctive impedance ratios.

17. The invention claimed in claim 16 wherein said tubular envelope means comprises a plurality of envelopes of vitreous material disposed coextensive with and parallel to each other within said first coil means and symmetrically arranged about the longitudinal axis of said first coil means, wherein said first member means comprises a plurality of flexible magnetic members, wherein said second member means comprises a plurality of flexible magnetic members, wherein a different pair of first and second member means is sealed in each different one of said envelopes and wherein said contact gap arrangement consists of the plurality of contact gaps within said envelopes.

References Cited in the file of this patent
UNITED STATES PATENTS

| | | |
|---|---|---|
| 2,187,115 | Ellwood et al. | Jan. 16, 1940 |
| 2,245,391 | Dickten | June 10, 1941 |
| 2,821,597 | Germanton et al. | Jan. 28, 1958 |
| 2,907,846 | Wilhelm | Oct. 6, 1959 |
| 2,978,556 | Lohs et al. | Apr. 4, 1961 |
| 2,981,810 | Nitsch | Apr. 25, 1961 |
| 3,009,998 | Pfleiderer | Nov. 21, 1961 |

OTHER REFERENCES

German application 1,059,567, printed June 18, 1959 (KL 21g 4/01).